United States Patent [19]

Strang et al.

[11] Patent Number: 5,744,754

[45] Date of Patent: Apr. 28, 1998

[54] ELECTRICAL RECEPTACLE INCORPORATING INTEGRAL ELECTRICAL WIRE STRAIN RELIEF ARRANGEMENT

[75] Inventors: Ward E. Strang, Fairfield; Carol Z. Howard, Oxford, both of Conn.

[73] Assignee: Hubbell Incorporated, Orange, Conn.

[21] Appl. No.: 811,632

[22] Filed: Mar. 5, 1997

[51] Int. Cl.⁶ ............................................................... H02G 3/18
[52] U.S. Cl. ......................................... 174/65 SS; 174/135
[58] Field of Search ................................. 174/50, 65 R, 174/135, 65 SS; 220/3.2, 4.02

[56] References Cited

U.S. PATENT DOCUMENTS

| | | | |
|---|---|---|---|
| 2,257,065 | 9/1941 | Olley | 174/50 |
| 2,309,741 | 2/1943 | Woodward | 174/65 R X |
| 2,352,913 | 7/1944 | Parker | 174/65 R X |
| 3,585,273 | 6/1971 | Paul | 174/65 R |
| 3,783,436 | 1/1974 | Bury | 339/107 |
| 3,826,935 | 7/1974 | Grierson et al. | 174/135 X |
| 4,178,057 | 12/1979 | McCormick | 174/65 R X |
| 4,192,571 | 3/1980 | Strautz | 339/103 M |
| 4,436,952 | 3/1984 | Lockwood | 174/65 R |
| 4,654,470 | 3/1987 | Feldman et al. | 174/65 R X |
| 4,724,281 | 2/1988 | Nix et al. | 174/65 R X |
| 5,064,967 | 11/1991 | Singbartl | 174/52.3 |
| 5,073,127 | 12/1991 | Daly et al. | 439/473 |
| 5,256,834 | 10/1993 | Gehring | 174/65 R X |
| 5,277,617 | 1/1994 | Shasteen | 439/465 |
| 5,314,352 | 5/1994 | Halbinger et al. | 174/65 R X |

FOREIGN PATENT DOCUMENTS

| | | | |
|---|---|---|---|
| 1127429 | 4/1962 | Germany | 174/135 X |
| 1151845 | 7/1963 | Germany | 174/135 X |
| 2550939 | 5/1977 | Germany | 174/135 X |
| 4304385 | 8/1994 | Germany | 174/65 R X |
| 905455 | 9/1962 | United Kingdom | 174/135 X |

OTHER PUBLICATIONS

IBM Technical Disclosure Bulletin, vol. 4 No. 8, p. 8. Jan. 1962, entitled "Strain Relief Device,".

*Primary Examiner*—Kristine L. Kincaid
*Assistant Examiner*—Dean A. Reichard
*Attorney, Agent, or Firm*—Jerry M. Presson; Leopold Presser

[57] ABSTRACT

A strain relief arrangement for electrical wires or cables and, more particularly, an electrical receptacle or housing incorporating an integral strain relief arrangement for electrical transmission cables or wires. The electrical receptacle has a rear wall structure including holes or apertures for the passage therethrough of electrical wires or cables, and in which each of the holes possesses a configuration adapted to incorporate a strain relief arrangement for the electrical wires or cables.

8 Claims, 2 Drawing Sheets

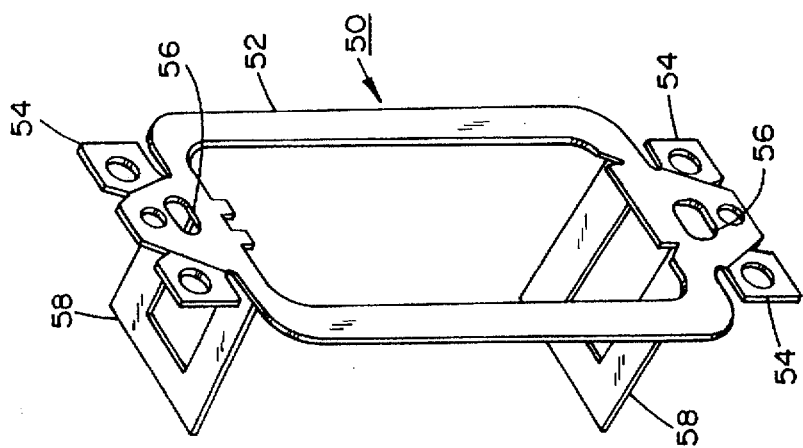
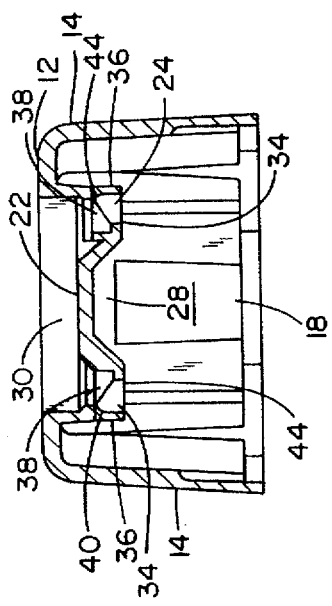
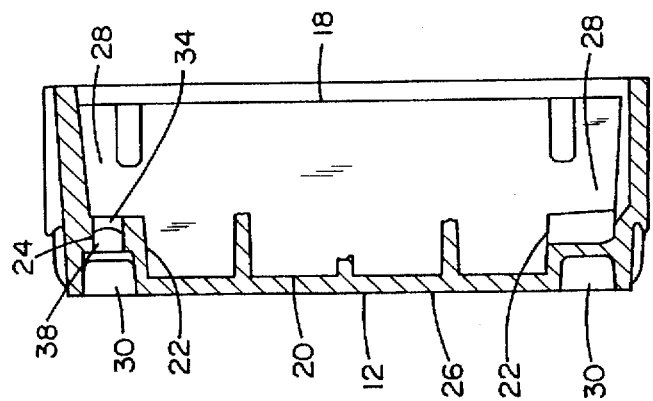
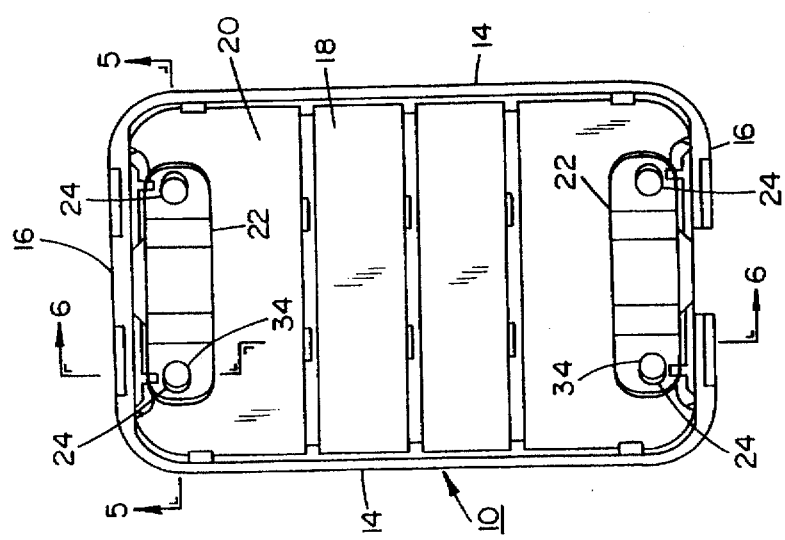

5,744,754

ELECTRICAL RECEPTACLE INCORPORATING INTEGRAL ELECTRICAL WIRE STRAIN RELIEF ARRANGEMENT

BACKGROUND OF THE INVENTION

1. Field of the Invention

The present invention relates to a strain relief arrangement for electrical wires or cables and, more particularly, relates to an electrical receptacle or housing incorporating an integral strain relief arrangement for electrical transmission cables or wires.

Utilization of strain relief devices or arrangements which are designed to protect the integrity of various electrical connections which are formed between electrical cables or wires and associated electrical connectors is well known and widely applied in the most diverse aspects of the electrical and electronics technology and industry. In essence, the imparting of tensile forces to electrical cables or wires subsequent to their connection to various connectors is frequently conducive towards an unintentional detaching of the electrical cables or wires from the therewith associated electrical connectors, thereby destroying operative interconnections and causing functional failures of the electrical components which are intended to be interconnected with the electrical cables or wires. In order to eliminate such potential hazards which would be conducive to the separation between the electrical interconnections or which could damage the electrical components, numerous and widely differing types of strain relief devices or arrangements have been developed in the technology, which are intended to impart clamping forces or other kinds of restraints to the electrical cables or wires in order to prevent these from being dislodged so as to result in disconnections between electrical components and failures rendering the reliable functioning of the electrical equipment difficult or even impossible to maintain.

Currently, in the electrical technology and industry, there have been developed and placed into operation numerous types of devices and arrangements which are adapted to provide strain relief functions between interconnected electrical cables or wires and electrical connectors; for example, such as are arranged in electrical receptacles or housings, among other applications.

2. Discussion of the Prior Art

Shasteen U.S. Pat. No. 5,277,617 discloses an electrical connector housing incorporating a strain relief device, wherein an electrical cable which is in operative interconnection with a connector of an electrical device located in the housing, has a clamping structure through the provision of two closely spaced and structurally overlapping wall portions of the housing so as to; in essence, impart a clamping or frictional crimping effect on an electrical transmission cable, thereby preventing the latter from being pulled and dislodged in an axial direction or tensile mode. This structure, in essence, will relieve any strain tending to act on the electrical connector which is in operative connection with the end of the electrical transmission cable located within the housing.

Daly et al. U.S. Pat. No. 5,073,127 pertains to a strain relief assembly for an electrical connector arrangement, whereby a plurality of flat cable connectors are clamped between cooperating clamping bar members so as to frictionally engage a ribbed surface which will inhibit any axial movement of the cable connectors, and resultingly produce a strain relief at the cable connecting locations.

Singhartl U.S. Pat. No. 5,064,967 discloses a housing containing at least one electrical component, and in which a cable head-through device includes a strain relief in the nature of a pair of opposingly moveable elements through which there is passed an electrical transmission cable. The elements include surface portions for cooperatively clampingly engaging the electrical transmission cable upon the latter being extended therethrough. This will prevent the cable from being axially displaced subsequent to clamping action exerted thereon by the elements, and prevent any strain from acting on an electrical connector which is attached or connected thereto.

Strautz U.S. Pat. No. 4,192,571 discloses a strain relief housing for flat cable and electrical connector terminations, in which flat plate elements are adapted to clampingly engage a plurality of electrical cables so as to restrict the axial displacement or shifting thereof which would tend to impart tensile forces to the electrical connectors which are attached to the cables, and consequently form a strain relief arrangement.

Finally, Bury U.S. Pat. No. 3,783,436 is directed to a clamping unit for electrical wires or cables wherein elements of a housing structure are adapted to have ears which are foldable so as to crimp into the cables and form a strain relief component of the housing, thereby eliminating the generating of any strain tending to disconnect the electrical cable or wires from the electrical connectors or terminals.

Although the foregoing patents describe various types of strain relief devices or arrangements which are each adapted to preserve the integrity of electrical connections between electrical cables or wires and electrical connectors so as to prevent any functional failure or disconnection of electrical devices which are frequently contained in electrical housings, receptacles or the like, all of these strain relief devices are relatively complex in nature and necessitate the use of either a multiplicity of components which interact mechanically with each other and are resultingly expensive to manufacture or they are difficult and laborious to install and assemble.

SUMMARY OF THE INVENTION

Accordingly, in order to derive an extremely simple and inexpensive strain relief arrangement for electrical cables or the like which are intended to lead into an electrical housing or receptacle for interconnection with electrical connectors and/or electrical devices, the present invention provides for a back cover or the main housing portion of an electrical box-like receptacle, preferably constituted of an electrically non-conductive or molded plastic material. Through-extending apertures or holes are formed in a rear wall of the receptacle through which the electrical cables or wires are passed. In this arrangement, each of the apertures or holes through which there is passed an electrical cable or wire includes a first axial portion and a second axial portion in communication with the first axial portion, the axes of which are laterally offset relative to each other through the rear wall of the electrical receptacle so as to form a non-linear or axially discontinuous, somewhat S-shaped path for the wire or cable conducted therethrough. Consequently, upon the wire or cable, when drawn through the two laterally offset portions of the aperture being linearly or axially tensioned, the wire is jogged in the region where the offset aperture portions meet. Accordingly, upon the cable or wire being pulled or tensioned, a frictional contact is produced between the outside sheeting or insulation of the wire or cable and the laterally offset well structure between the mating portions of the aperture or hole which; in effect, will cause a clamping action inhibiting the cable from being pulled through any further and creating a strain relief. Moreover, the mating ends of the walls of the offset strain relief hole portions in the rear wall of the electrical receptacle are constructed to form an oblique angle so as to facilitate the cable or wire to be fed through during assembly or installation, and possibly one of the aperture or hole portions; for instance, the rearward portion may possess a somewhat larger diameter than the mating hole portion, in order to facilitate easier initiation of the wire assembly or installation procedure. Upon the wire having been pulled through the aperture or hole to the desired extent, it is tensioned axially and straightened so as to jog and frictionally engage the juncture between the aperture or hole portions and thereby prevent or inhibit further axial movement, thereby generating a strain relieving effect. The back surface of the rear wall of the electrical receptacle extending about the strain relief holes or apertures through which the electrical cables have been passed, may have a recess or wall formed therein, which can be filled with a potting compound in order to control the positioning of the wire or electrical cables and/or to also produce a water-tight seal in the area of the holes in the electrical receptacle.

Accordingly, it is an object of the present invention to provide an electrical receptacle having a rear wall structure including holes or apertures for the passage therethrough of electrical wires or cables, and in which each of the holes possesses a configuration adapted to incorporate a strain relief arrangement for the electrical wires or cables.

A further object of the present invention resides in the formation of strain relief-imparting holes or apertures in electrical receptacles through which holes electrical wires or cables for electrical connections are adapted to be passed, and wherein the holes each include wall structure engageable with the wires so as to produce a strain relief effect upon installation.

A still more specific object of the invention resides in providing strain relief arrangements in connection with the apertures or holes formed in the electrical receptacle through which the wires or electrical cables are passed, in that each of the holes have offset hole portions along the axial extent thereof in the wall of the receptacle so as to form protruding or offset surface locations engaging the electrical wires or cables therein and to form a frictional clamping engagement therewith by jogging the wires upon straightening or tensioning of the wire so as to produce a strain relief effect inhibiting the wires from being axially displaced.

Yet another object of the present invention is to provide strain relief holes or apertures of the type described in electrical receptacles, and in which wells formed in the rear surface of the receptacle about the holes are adapted to be filled with a potting compound for providing a positioning aid for the wires and desirably a water-tight seal between the wires and receptacle.

BRIEF DESCRIPTION OF THE DRAWINGS

Reference may now be had to the following detailed description of a preferred embodiment of the invention, taken in conjunction with the accompanying drawings; in which:

FIG. 4 illustrates a front view of the electrical receptacle of FIG. 1;

FIG. 5 illustrates a sectional view taken along line 5—5 in FIG. 4;

FIG. 6 illustrates a sectional view taken along line 6—6 in FIG. 4; and

FIG. 7 illustrates a perspective view of a bridge which is adapted to be mounted on the electrical receptacle as shown in FIG. 1.

DETAILED DESCRIPTION OF A PREFERRED EMBODIMENT

Figure 3:
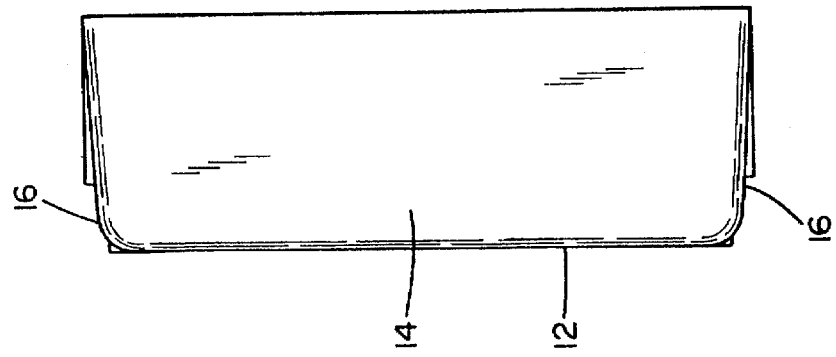
FIG. 3 illustrates a side view of the electrical receptacle.
Figure 2:
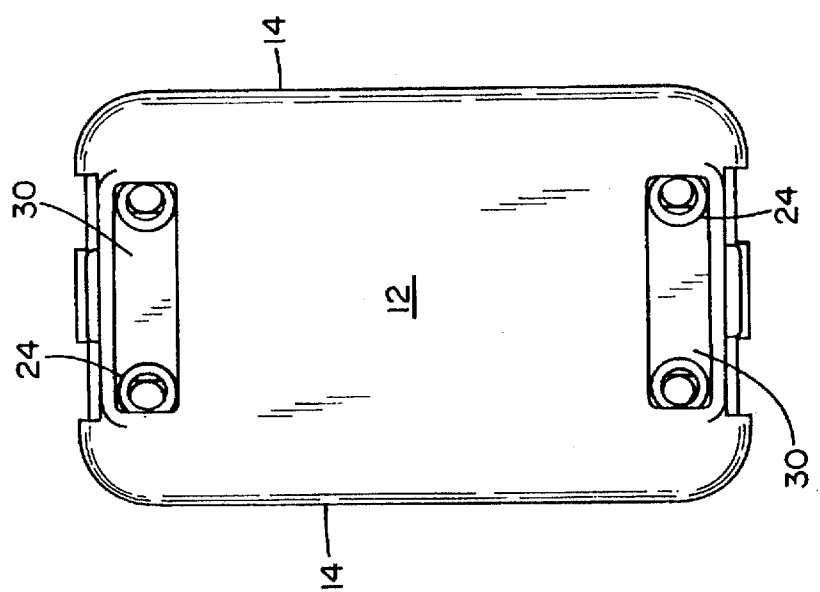
FIG. 2 illustrates a rear view of the electrical receptacle of FIG. 1.
Figure 1:
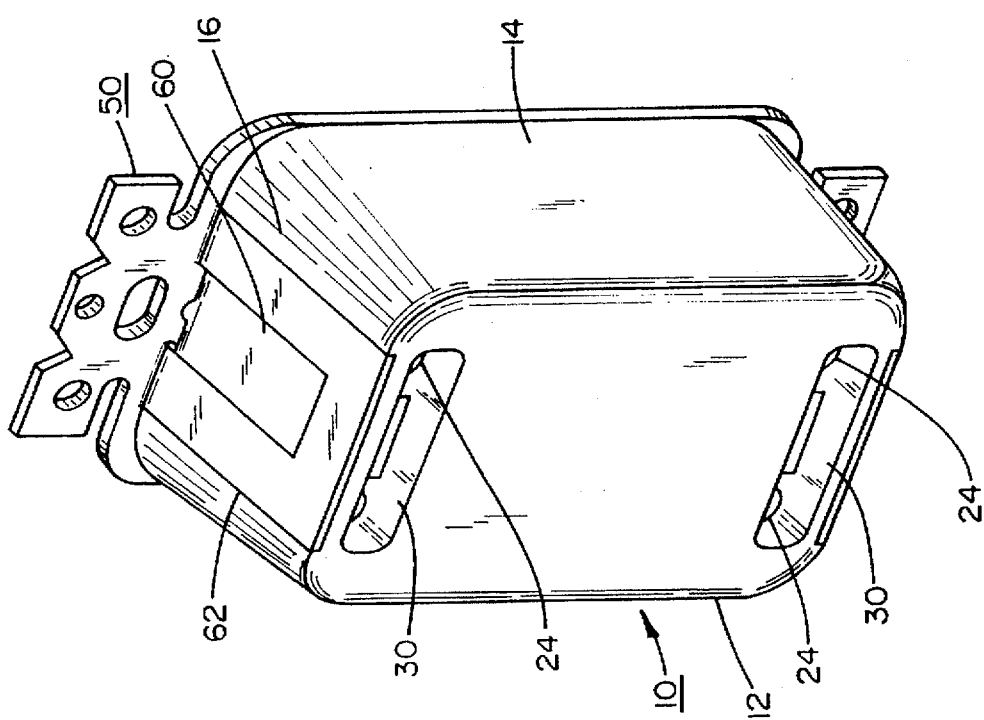
FIG. 1 illustrates a perspective rear and side view of an electrical receptacle incorporating an arrangement for the strain relief of electrical wires or cables.

Referring now, in particular, to drawing FIGS. 1 through 6, there is disclosed the back portion of an electrical receptacle 10, which in essence is of a box-shaped configuration, having a generally planar rear wall 12, upstanding sidewalls 14 and end walls 16, and which is open towards the front 18 thereof. Preferably, although not necessarily, the electrical receptacle 10 is constituted of a generally rigid molded plastic material, for example, such as a polyvinyl chloride, and may be impregnated with a suitable coloring agent as desired, or may be constituted of other suitable electrically non-conductive plastic or non-metallic materials, as is well known in the electrical and electronics technology.

Formed in the interior or front surface 20 of the rear wall 12 of the electrical receptacle, proximate to and inwardly of the upper and lower end walls 16 thereof, are raised boss structures 22 which are generally elongated in shape with each boss structure 22 possessing a pair of spaced apertures or round holes 24 extending therethrough to the outside of the exterior surface 26 of the rear wall 12.

In each of the regions 28 of the receptacle portion 10 wherein the boss structures 22 containing tile holes 24 are located, a recess or well 30 is formed in the outside surface 26 of the rear wall 12, each well 30 being of a generally elongated or oblong configuration, into which the respective pairs of round holes 24 extend.

Formed in the interior of the electrical receptacle 10 are suitable upstanding ribs, which may be utilized in conjunction with a front or receptacle cover (not shown), and in order to position or orient electrical devices (not shown) equipped with connectors adapted to be connected to suitable electrical wires or cables which extend into receptacle 10 from the rear wall 12 of the electrical receptacle through the holes 24, as may be required for specific installations.

In order to impart a strain relief effect with regard to electrical wires or cables which are passed through the respective holes 24, each hole 24 includes a first portion 34 communicating with the interior of the receptacle 10 and extending through the inward portion 36 of the raised boss structure 22 in which it is formed, as shown in FIG. 5. Each hole 24 further includes a second hole portion 38 somewhat laterally offset with respect to hole portion 34, but in coextensive connection therewith. The second hole portion 38 opens at its rearward end into the recess or well 30 formed in the rear wall 12 of the electrical enclosure 10. In essence, this causes a generally zig-zag or jogging path to be taken by any electrical wire or cable being passed through the hole 24 at the juncture 40 between the first and second hole portions 34, 38 of each respective hole 24.

In order to facilitate and render easier the insertion of, respectively, one or more electrical wires or cables through the offset hole portions 34, 38 of a hole 24, the juncture 40 may be formed at an angle relative to the axes of the hole portions. Moreover, one of the hole portions in communication with the laterally offset second hole portion of each hole 24, preferably, although not necessarily, the outer hole portion 38 towards the rear wall 12 and terminating in the well 30, may be of a somewhat larger diameter than inwardly located hole portion 34 to aid in inserting the wire or cable. Thus, as may be clearly ascertained from FIG. 5, each of the holes 24, at the juncture 40 between the first and second hole portions 34, 38 thereof causes the formation of a protruding flange or ledge-like annular wall structure 44, which, when a wire or cable is tensioned or straightened while having been passed therethrough, comes into a frictional engagement with the exterior surface or insulation of each wire or cable by forcing the latter to "jog" or zig-zag in the region of juncture 40 between the hole portions 34, 38. Thus, upon the wire or cable being pulled straight or tensioned upon installation, frictional contact is procontact is produced between the outside of the wire or cable and the annular wall structure 44 at the juncture 40 between the laterally offset hole portions 34, 38 which will prevent the wire or cable from being pulled through any further so as to form a strain relief at the connection of the latter with a connector in the receptacle 10. As previously mentioned, the juncture 40 between the two mating strain relief hole portions 34, 38 is angled relative to the axes thereof, to allow the wire or cable to easily feed through while pulling the wire outwardly through the strain relief hole 24, with the diameter of one hole portion 38 preferably being larger than the other hole portion 34 to allow easier initiation of the wire or cable assembling or feed-through sequence.

As shown in FIG. 7 of the drawings, a front bridge 50, which consists of a rectangular frame 52 and positioning lugs 54, and also having apertures 56 for mounting the structure to a wall box or the like, may be mounted on the receptacle 10, by having generally perpendicularly extending, closed loop plate members 58 at opposite ends thereof, clampingly engaged over projections 60 molded on the upper and lower external end surfaces 62 (shown in FIG. 1) of the electrical enclosure or receptacle 10. Thereafter, a suitable front cover (not shown), as is well known in the technology, may be fastened to the bridge frame to complete the assembly.

In order to ensure that the wires or cables which have been passed through the strain relief holes 24 are maintained in position secured against axial displacement, or in order to attain a water-tightly sealed environment for the wires extending through holes 24 of the electrical receptacle 10, the region or area surrounding each of the hole portions 38 communicating with the well 30 may be provided with a quantity of a potting compound, or if desired, the well 30 may be entirely filled with such potting compound.

From the foregoing, it becomes readily apparent, that, in contrast with the relatively complex and expensive strain relief devices and arrangements described in the prior art, the present invention provides for a unique strain relief arrangement in a simple and inexpensive manner without necessitating the provision of any mechanical or movable components, with the strain relief arrangement being integrally molded in the electrical enclosure or receptacle 10 itself, thereby rendering the entire arrangement inexpensive and adapted to mass-production techniques, and able to have the wires and cables installed by relatively unskilled labor with minimum effort, such strain relief effect being initiated by simply tensioning or straightening the wires or electrical cables subsequent to being passed or fed through the strain relief hole 24 in which it is positioned.

While there has been shown and described what are considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What is claimed is:

1. An electrical receptacle incorporating an integral electrical wire strain relief arrangement, said receptacle comprising:
    (a) a housing having a rear wall, sidewalls and end walls forming a generally box-shaped structure;
    (b) and structure formed unitarily with at least one of said housing walls including at least one through hole for the passage therethrough of at least one electrical wire or cable, said at least one through hole having first and second laterally offset hole portions along an axial extent thereof, a juncture between said first and second hole portions extending at an angle to the axial extent of said hole portions so as to form a strain relief-forming wall structure for said electrical wire or cable which is passed through one of said at least one through hole upon being tensioned and straightened to frictionally contact a wall surface of said at least one through hole in at least a region of the junture between said hole portions; and
    (c) a well being formed in an outer surface of said at least one of said housing walls about said at least one through hole, said well being fillable with a potting compound so as to form a water-tight seal about said electrical wire or cable extending from said at least one through hole externally of the housing.

2. An electrical receptacle as claimed in claim 1, wherein said structure is formed unitarily with the rear wall of said housing.

3. An electrical receptacle as claimed in claim 1, wherein said electrical receptacle consists of a unitarily molded plastic material.

4. An electrical receptacle as claimed in claim 3, wherein said plastic material comprises polyvinyl chloride.

5. An electrical receptacle as claimed in claim 1, wherein said structure having said at least one through hole comprises a raised boss extending from an inner surface of said at least one of said housing walls into said housing, said first hole portion extending from a region within said boss to an interior of said housing and said second hole portion extending from the juncture between said hole portions through said at least one of the housing walls to an exterior of said housing.

6. An electrical receptacle as claimed in claim 5, wherein the second hole portion of said at least one through hole possesses a larger diameter than the first hole portion to facilitate initiation of insertion of said electrical wire or cable into said at least one through hole from exteriorly of said housing.

7. An electrical receptacle as claimed in claim 2, wherein said raised boss comprises at least two raised bosses which are formed spaced at respectively proximate opposite ends interiorly of said housing and wherein said at least one through hole comprises at least four through holes, one pair of said through holes being provided in each raised boss.

8. An electrical receptacle as claimed in claim 7, wherein an additional well and said well are formed in said outer surface of said at least one of said housing walls about each pair of through holes at each end of said housing, said wells being fillable with a potting compound so as to form water-tight seals about said electrical wires or cables extending from said through holes externally of the housing.

* * * * *